United States Patent [19]

Terano et al.

[11] Patent Number: 5,130,284

[45] Date of Patent: * Jul. 14, 1992

[54] SOLD CATALYST COMPONENT FOR THE POLYMERIZATION OF OLEFINS AND AN OLEFIN POLYMERIZATION CATALYST

[75] Inventors: Minoru Terano, Chigasaki; Hirokazu Soga, Kanagawa; Masuo Inoue, Chigasaki, all of Japan

[73] Assignee: Toho Titanium Co., Ltd., Tokyo, Japan

[*] Notice: The portion of the term of this patent subsequent to Nov. 13, 2007 has been disclaimed.

[21] Appl. No.: 582,415

[22] Filed: Sep. 14, 1990

[30] Foreign Application Priority Data

Apr. 27, 1990 [JP] Japan ................... 2-110214

[51] Int. Cl.$^5$ .............................. C08F 4/651
[52] U.S. Cl. ...................... 502/125; 502/107; 526/124
[58] Field of Search ................... 502/125, 107

[56] References Cited

U.S. PATENT DOCUMENTS 4,414,132 11/1983 Goodall et al. ............ 502/104
4,970,186 11/1990 Terano et al. ............. 502/125

FOREIGN PATENT DOCUMENTS 52-98076 8/1977 Japan .
53-2580 1/1978 Japan .
55-152710 11/1980 Japan .
57-63309 4/1982 Japan .
61-197607 9/1986 Japan .
1-315406 12/1989 Japan .

Primary Examiner—Patrick P. Garvin
Attorney, Agent, or Firm—Birch, Stewart Kolasch & Birch

[57] ABSTRACT

A solid catalyst component prepared under specific conditions by reacting with a reaction product which has been obtained by suspending diethoxymagnesium in an alkylbenzene and bringing the suspension into contact with titanium tetrachloride, phthaloyl dichloride at 80°-125° C., washing the resultant solid material with an alkylbenzene, reacting the solid material in the presence of an alkylbenzene with titanium tetrachloride to form a solid substance, and repeating the process of the following steps (1), (2), (3) and (4) 2-4 times for the solid substance:

(1) washing the solid substance with an alkylbenzene,
(2) suspending the solid substance in an alkylbenzene,
(3) bringing the resultant suspension into contact with the titanium tetrachloride, and
(4) eliminating a liquid substance from the reaction mixture as far as possible, as well as an olefin polymerization catalyst which comprises (A) the above specified solid catalyst component, (B) a specific silicon compound and (C) a specific organoaluminum compound. This catalyst exhibits, as compared with the existing olefin polymerization catalysts, an extremely high level of catalytic performance in polymerization activity, stereospecific performance and durability of the activity, and enables the production of stereoregular olefin polymers in an extremely high yield with a negligible residual ash content.

6 Claims, No Drawings

SOLID CATALYST COMPONENT FOR THE POLYMERIZATION OF OLEFINS AND AN OLEFIN POLYMERIZATION CATALYST

BACKGROUND OF THE INVENTION

1. Field of the Invention

The present invention relates to a high performance solid catalyst component and an olefin polymerization catalyst using same. More particularly, the present invention relates to a solid catalyst component derived from diethoxymagnesium, titanium tetrachloride and a phthaloyl dichloride in the presence of an alkylbenzene according to a specific procedure and an olefin polymerization catalyst comprising the solid catalyst component, a specific silicon compound and a specific organolauminum compound, the catalyst being capable of exhibiting an extremely high polymerization activity combined with a high stereospecific performance and producing stereoregular olefin polymers substantially free of any residual chlorine in a high yield.

2. Description of the Prior Art

From the past, there are proposed a number of solid catalyst components for the polymerization of olefins or olefin polymerization catalysts containing the solid catalyst components, the solid catalyst components being comprised of a dialkoxymagnesium titanium tetrachloride and an electron donor. For example, such solid catalyst components and olefin polymerization catalysts containing the solid catalyst components are disclosed in Japanese Laid-open Patent Appln. Nos. Sho. 55-152710 (U.S. Pat. No. 4,414,132), 52-98076, 53-2580, 57-63309, 61-197607, etc.

However, the solid catalyst components prepared according to the processes disclosed in these references could not be said to be satisfactory upon using the polymerization of olefins in all of (1) polymerization activity, (2) yield of the stereoregular polymers and (3) durability of polymerization activity.

In Japanese Laid-open Patent Appln. No. Hei. 1-315406, the present inventors already proposed an olefin polymerization catalyst which comprises (A) a solid catalyst component prepared by bringing diethoxymagnesium into contact, after being suspended in an alkylbenzene, with titanium tetrachloride in an amount less then 1 in terms of volume ratio to the alkylbenzene, adding phthaloyl dichloride at a temperature of 80°-125° C. to the resultant reaction product to form a reaction mixture, washing the obtained solid substance with an alkylbenzene, and reacting the solid substance in the presence of the alkylbenzene with titanium tetrachloride in an amount less than 1 in terms of volume ratio to the alkylbenzene, (B) a specific silicon compound and (C) an organoaluminum compound, and succeeded in providing a solid catalyst component capable of exhibiting high performance in polymerization activity, durability of the activity and the yield of stereoregular polymers.

In the field of polymerization of olefins, however, such a catalyst is demanded in the art as is higher in polymerization activity while maintaining a high yield of the stereoregular polymers. Under such circumstances, there is still a great demand for developing a new solid catalyst component and a new olefin polymerization catalyst, which satisfy the newly required high performance in the industry for the polymerization of olefins.

BRIEF SUMMARY OF THE INVENTION

Accordingly, it is an object of the present invention to provide a new solid catalyst component for olefin polymerization catalysts which exhibits an extremely high performance in polymerization activity and in stereospecific property.

It is another object of the present invention to provide a new solid catalyst component for olefin polymerization catalysts which can be prepared according to a series of specific treatments unexpected from the prior arts.

It is still another object of the present invention to provide a new olefin polymerization catalyst possessing an extremely high level of durable catalytic performance in polymerization activity and in stereospecific property of polymers.

It is further object of the present invention to provide a new olefin polymerization catalyst which satisfies all of the demands in the art.

Other and further objects, features and advantages of the present invention will be apparent more fully from the following description.

As a result of further extensive research made by the present inventors for developing a new olefin polymerization catalyst satisfying all of the demands in the art, it has now been found that the catalytic performance including polymerization activity, stereospecific property of polymers and durability of the activity can further be improved by subjecting a solid substance obtained by reacting diethoxymagnesium in the presence of an alkylbenzene with phthaloyl dichloride and titanium tetrachloride to a recurring treatment with titanium tetrachloride in the presence of an alkylbenzene under specific conditions to form a new solid catalyst component and combining the solid catalyst component with a specific silicon compound and a specific organoaluminum compound to form a new olefin polymerization catalyst. The present invention has been accomplished on the basis of the above finding.

DETAILED DESCRIPTION OF THE INVENTION

In accordance with one embodiment of the present invention, there is provided a solid catalyst component for the polymerization of olefins, prepared by a series of the steps:

(1) suspending diethoxymagnesium (a) in an alkylbenzene (b), (2) bringing the resultant suspension into contact with titanium tetrachloride (c) in an amount of less than 1 in terms of volume ratio to the alkylbenzene (b), (3) adding phthaloyl dichloride (d) to the obtained mixture at a temperature ranging from 80° C. to 125° C. and subjecting the whole to reaction to form a reaction mixture, (4) maintaining the reaction mixture at a temperature within the above range for a period of 10 minutes to 10 hours under agitation, (5) eliminating a liquid substance from the reaction mixture as far as possible to obtain a solid material, (6) washing the solid material with an alkylbenzene and suspending the solid material in the alkylbenzene (b), (7) bringing the resultant suspension into contact with the titanium tetrachloride (c) in an amount less than 1 in terms of volume ratio to the alkylbenzene (b) to form a reaction mixture, (8) eliminating a liquid substance from the resultant reaction mixture as far as possible to obtain a solid substance, and (9) repeating the process consisting of the following steps (9-1), (9-2), (9-3) and (9-4) 2-4 times for the solid substance:
   (9-1) washing the solid substance with an alkylbenzene,
   (9-2) suspending the solid substance in the alkylbenzene (b),
   (9-3) bringing the resultant suspension into contact with the titanium tetrachloride (c) in an amount of less than 1 in terms of volume ratio to the alkylbenzene (b) to form a reaction mixture, and
   (9-4) eliminating a liquid substance from the reaction mixture as far as possible to obtain a solid substance.

In accordance with another embodiment of the present invention, there is provided an olefin polymerization catalyst which comprises:

(A) the solid catalyst component as claimed in claim 1, (B) a silicon compound of the general formula:

$$SiR_m(OR')_{4-m} \qquad (I)$$

wherein R is a group selected from an alkyl group, a cycloalkyl group, an aryl group and vinyl group, R' is an alkyl group, and m is an integer satisfying the relation $0 \leq m \leq 3$, with the proviso that when m is 2 or 3, the plural R may be the same or different, and when R is an alkyl group, R may be same as R', and (C) an organoaluminum compound of the general formula:

$$R''_n AlX_{3-n} \qquad (II)$$

wherein R'' is an alkyl group, X is a halogen atom and n is an integer of 1-3, with the proviso that when n is 2 or 3, plural R'' groups may be identical or different.

In the present invention, the particular factors specified herein, i.e., a combination of the sorts of the reactants and solvents, the proportion of the reactants and solvents, the order of adding the reactants in the system, and the range of temperature is important for achieving the solid catalyst component and the olefin polymerization catalyst possessing expected high performance and catalytic activity. If the preparation of the solid catalyst component is carried out under the conditions outside the specified range or not in accordance with the specified order of the treatments, the polymerization activity and the stereospecific performance will be reduced so that the yield of the stereoregular polymer will be decreased and/or the content of residual chlorine in the polymer will be increased.

The diethoxymagnesium (a) used as reactant for the preparation of the solid catalyst component is commercially available as a pure reagent but is easily prepared prior to actual use according to a method known per se.

The alkylbenzene (b) used for suspending the diethoxymagnesium (a) has one or more straight or branched chain alkyl groups on the benzene ring. The alkyl moiety has preferably 1-8 carbon atoms. The alkylbenzene (b) is widely commercially available. Illustrative of the alkylbenzene (b) are, for example, toluene, xylene, ethylbenzene, propylbenzene, isopropylbenzene and trimethylbenzene. The use of toluene or xylene is preferable.

The titanium tetrachloride (c) used as reactant is commercially available as a pure reagent.

The phthaloyl dichloride (d) used as reactant can be prepared from phthalic acid, for example, by reacting it with thionyl chloride or the like chlorinating agent.

The solid catalyst component of the present invention is prepared according to a specific process from the essential ingredients (a), (b), (c) and (d). First of all, diethoxymagnesium (a) is suspended in the alkylbenzene (b) normally in an amount sufficient enough to form a suspension of the ingredient (a) at ambient temperature. The diethoxymagnesium (a) can easily be suspended in the alkylbenzene (b) by using a mechanical means such as stirrer or an ultrasonic vibration device. The suspension thus formed is then brought into contact under agitation with titanium tetrachloride (c) usually at ambient temperature. The amount of the titanium tetrachloride (c) is so adjusted that it is less than 1 in terms of volume ratio to the alkylbenzene (b) and is at least 1.0 g per 1.0 gram of the diethoxymagnesium (a). If the above proportions are greater or smaller than the above ranges, the polymerization activity and the yield of stereoregular polymers will be reduced but the polymerization itself will proceed without any trouble. As the treatments for forming the suspension and for the contact with the ingredient (c) are conducted at ambient temperature by the aid of a simple device, the operations are simple and easy and bring about economical advantages. The reaction product thus obtained was then heated to a temperature of 80°-125° C. and a given amount of phthaloyl dichloride (d) was added thereto. The phthaloyl dichloride is usually used in an amount of 0.01-0.5 ml per 1.0 g of the diethoxymagnesium (a). The mixture was stirred while maintaining the temperature at 80°-125° C. The reaction is continued until it is finished. Usually, a period of time from 10 minutes to 10 hours will be sufficient for completion the reaction. If the temperature becomes lower than 80° C., the bulk density of the polymer and the yield of the stereoregular polymer will adversely be influenced. The upper limit of the reaction temperature is established in consideration of the boiling point of the titanium tetrachloride. After completion of the reaction, the resultant solid material is separated from the reaction liquid as far as possible by decantation, suction or the like means and washed with a proper amount of an alkylbenzene which may be identical with or different from the alkylbenzene (b) used for forming the suspension of diethoxymagnesium (a). No particular limitation exists in the temperature for washing the solid material. Prior to the washing with the alkylbenzene, the solid material may be washed preliminarily with any suitable inert organic solvent other than the alkylbenzene. Preferable examples of the inert organic solvent include benzene and aliphatic hydrocarbons such as n-heptane.

After the washing treatment, the solid substance is reacted in the presence of the alkylbenzene (b) with further titanium tetrachloride (c) in an amount less than 1 in terms of volume ratio to the alkylbenzene (b). No particular limitation exists in reaction temperature for this reaction but the reaction is preferably carried out at a temperature within the range of 80°-125° C. for a period of 10 minutes to 10 hours. A preferable temperature range for this reaction is suitably chosen according to the sort of the alkylbenzene (b) used for this reaction.

A liquid substance comprised predominantly of the alkylbenzene is removed as far as possible from the reaction product by a suitable means such as decantation or suction to obtain a solid substance. Next, the process consisting of the following steps (1), (2), (3) and (4) is repeated 2-4 times for this solid substance:

(1) washing the solid substance with an alkylbenzene,
(2) suspending the solid substance in the alkylbenzene (b),
(3) bringing the resultant suspension into contact with the titanium tetrachloride (c) in an amount of less than 1 in terms of volume ratio to the alkylbenzene (b) to form a reaction mixture, and
(4) eliminating a liquid substance from the reaction mixture as far as possible to obtain a solid substance.

In comparison of the case wherein the above process consisting of the steps (1)-(4) is repeated 2-4 times in the present invention with the case of not carrying out the above process as in the process of Japanese Laid-open Patent Appln. No. Hei. 1-315406 and with the case wherein the above process is carried out only once, it is noted that the polymerization activity of the solid catalyst component in case of being used as a catalyst for the polymerization olefins is extremely higher in the case of repeating the above process consisting of the steps (1)-(4) 2-4 times. If this process is repeated more than 4 times, further increasing of the polymerization activity will not be expected and the activity may rather be reduced.

Throughout the steps for preparing the solid catalyst component, the alkylbenzene (b) initially used for the forming the suspension of diethoxymagnesium (a) should be identical with the alkylbenzene (b) secondly used for the reaction with titanium tetrachloride or thirdly used for the preparation of a suspension of the solid material or solid substance, so far as the symbol "(b)" is attached to alkylbenzene. In this sense, it is preferred that the alkylbenzene used merely for washing the solid material or substance is identical with the alkylbenzene (b), considering the recovery of solvent after the treatment.

The temperature on washing the solid substance with the alkylbenzene is preferably within the range from 90° C. to the boiling point of the alkylbenzene although no limitation exists, as described above, in the washing temperature.

A series of these treatments in the preparation of the solid catalyst component are usually carried out in a confined reaction container equipped with a stirrer and a means for heating and cooling the reaction container externally and in the absence of air and moisture to prevent any deterioration of the quality of the solid catalyst component. Accordingly, it is convenient to replace the air in the reaction container by nitrogen.

The solid catalyst component finally obtained may be washed further, if necessary, with an inert organic solvent such as n-heptane. The solid catalyst component is used as such for the preparation of an olefin polymerization catalyst or may be stored in dry state, in wet state or in an inert organic solvent for a prolonged period of time without any reduction in its catalytic performance.

The solid catalyst component (A) thus prepared is combined with the silicon compound (B) of the general formula (I) and the organoaluminum compound (C) of the general formula (II) to prepare an olefin polymerization catalyst of this invention.

The silicon compound (B) of the general formula (I) used in the present invention can be prepared according to methods known per se from the corresponding starting compounds. The alkyl group in this compound may be linear or branched and generally has 1-8, preferably 1-4 carbon atoms. Preferable examples of the alkyl 1-4 group include methyl, ethyl, propyl, isopropyl, n-butyl and isobutyl. The cycloalkyl group generally has 5-8, preferably 5-6 carbon atoms. Preferable examples of the cycloalkyl group include cyclopentyl and cyclohexyl. The aryl group generally includes phenyl or naphthyl group which may carry one or more ring substituents. Illustrative of such aryl group are phenyl, tolyl, xylyl and naphthyl. When m is zero, the silicon compound is a tetraalkoxysilane wherein 4 alkoxy groups may be the same or different. When m is 2, the two R groups and the two R' groups may be respectively same or different. When m is 1 or 3, the three R groups or the three R' groups may be respectively same or different. The plural R or R' groups are preferably identical because of easiness in preparing the silicon compound.

Accordingly, the silicon compound preferably includes tetraalkoxysilane, alkylalkoxysilane, phenylalkoxysilane, phenylalkylalkoxysilanes, cycloalkylalkoxysilanes, cycloalkylalkylalkoxysilanes, cycloalkylphenylalkoxysilanes, cycloalkylalkylphenylalkoxysilanes, and the corresponding silanes wherein either of the alkyl, cycloalkyl and phenyl groups is replaced by vinyl group. Illustrative of the tetraalkoxysilane are, for example, tetramethoxysilane, tetraethoxysilane, tetrapropoxysilane and tetrabutoxysilane. Illustrative of the alkylalkoxysilane are, for example, trimethoxyethylsilane, trimethoxymethylsilane, dimethyldimethoxysilane, triethylmethoxysilane and trimethylmethoxysilane. Illustrative of the alkylalkoxysilane are, for example, trimethoxyethylsilane, trimethoxymethylsilane, triethoxymethylsilane, ethyltriethoxysilane, ethyltriisopropoxysilane. Illustrative of the phenylalkoxysilane are, for example, phenyltrimethoxysilane, phenyltriethoxysilane, phenyltripropoxysilane, phenyltriisopropoxysilane, diphenyldimethoxysilane, diphenyldiethoxysilane and triphenylmethoxysilane. Illustrative of the cycloalkylalkoxysilane are, for example, cyclohexyltriethoxysilane, dicyclopentyldimethoxysilane and tricyclohexylethoxysilane. Besides these compounds, examples of the silicon compound include phenyl(methyl)dimethoxysilane, cyclohexyl(ethyl)phenylmethoxysilane, dicyclohexyldiethoxysilane, vinyltrimethoxysilane, vinyl(dimethyl)methoxysilane, and vinyl(cyclohexyl)methyl methoxysilane. A mixture of these silicon compounds may also be used.

The organoaluminum compound (C) of the general formula (II) is commercially available as a pure reagent, but may be prepared prior to actual use according to methods known per se. The alkyl group on this compound may be linear or branched and generally has 1-8, preferably 1-4 carbon atoms, while the halogen atom is preferably a chlorine or bromine atom. Thus, the organoaluminum compound includes a trialkylaluminum, a dialkylaluminum halide and an alkylaluminum dihalide as well as a mixture of these aluminum compounds. Preferable examples of the organoaluminum compound include triethylaluminum, tripropylaluminum, triisopropylaluminum, tributylaluminum, triisobutylaluminum, diethylaluminum chloride, diethylaluminum bromide, diisopropylaluminum chloride, dibutylaluminum chloride, ethylaluminum dichloride, propylaluminum dichloride and butylaluminum chloride. Particularly preferable are trialkylaluminums with triethylaluminum and triisobutylaluminum being most preferable.

In the preparation of the catalyst, the organoaluminum compound (C) is used in an amount of 1-1000, preferably 10-500, in terms of a molar ratio to the titanium atom contained in the solid catalyst component (A). On the other hand, the silicon compound (B) is used in an amount of 0.01-0.5 in terms of a molar ratio to the organoaluminum compound (C). If the amount of the organoaluminum compound (C) is less than 1 in terms of the molar ratio, the catalyst performance of the resultant catalyst will be reduced. On the other hand, no additional advantage will be obtained if the amount exceeds 1000 in terms of the molar ratio. Thus, the upper limit of the amount of the organoaluminum compound (C) is set only for the economical reasons. If the silicon compound (B) is employed in an amount of less than 0.01 in terms of the molar ratio, isotacticity of the resultant polymer will be reduced, i.e. the yield of the crystalline polymer will be decreased. On the other hand, if the amount of the silicon compound (B) exceeds 0.5 in terms of the molar ratio, an undesirable problem will arise in the catalytic activity of the resultant catalyst.

By the term "polymerization" is meant herein any type of the polymerizations including homopolymerization and copolymerization of olefins as well as any mode of the polymerization including gas or bulk polymerization in the absence of any polymerization solvent and slurry or solution polymerization in the presence of a polymerization solvent. The olefin utilizable for the polymerization is $C_1$-$C_4$ $\alpha$-olefins and involves ethylene, propylene, 1-butene and a mixture of these olefins. Such olefin can be used in either gaseous or liquid state.

The polymerization of olefins by the aid of the catalyst of the present invention can be carried out according to a usual method for the gas or bulk polymerization or for the slurry or solvent polymerization. The polymerization temperature adopted in this case is lower than 200° C., preferably lower than 100° C., while the polymerization pressure is less than 100 kg/cm$^2$.G, preferably less than 50.kg cm$^2$.G. These conditions generally vary according to the sort of olefins, the type of polymerization adopted and can be selected suitably by those skilled in the art, taking into consideration the various factors for polymerization and incidental economical problems.

It is one of the characteristic features of this invention that olefin polymers produced by the aid of the catalyst of this invention have an extremely high stereoregularity.

In the production of olefin polymers in commercial scale, the bulk density of the produced polymer is taken up as a very important problem in view of the capacities of the production in the polymerization apparatus and of the after-treatments. It is another characteristic feature of this invention that the catalyst of this invention gives polymers of a high bulk specific gravity and serves to solve this problem.

As the catalyst of this invention exhibits a very high level of activity never expected from the prior arts, the residual amount of the catalyst in the resultant polymer can be controlled to an extremely low level. Accordingly, it is still another characteristic feature of this invention that the amount of a residual chlorine in the resultant polymer is extremely small so that any influence of chlorine on the polymer can be eliminated to such a degree that any deashing treatment is quite unnecessary as after-treatment.

Furthermore, it is a great merit that the expected reduction in the activity with the lapse of time is extremely low so that the catalyst can advantageously be used even in such case that polymerization time must be extended for copolymerization of olefins where a long period of time is required.

It is generally admitted in the production of olefin polymers in industrial scale, that hydrogen is allowed to be co-existent in the polymerization system to control the melt index of the resultant polymer. The catalyst of the present invention achieves a significant merit that its catalytic activity and stereospecific performance are scarcely deteriorated in case of performing the polymerization of olefins in the co-existence of hydrogen even if the melt index of the resultant polymer is extremely high. Thus, the catalyst of the present invention contributes greatly in the production of stereoregular olefin polymers with a high bulk specific gravity in a higher yield.

The present invention will now be illustrated in more detail by way of Examples and Comparative Examples.

EXAMPLE 1

Preparation of a solid catalyst component

In a 500 ml round-bottomed flask equipped with a stirrer, the air in which had sufficiently been replaced by nitrogen, were placed (1) 10 g of diethoxymagnesium and 60 ml of toluene. The mixture was stirred to make it in suspended state. To this suspension was added (2) 40 ml of TiCl$_4$ and, after elevating the temperature of the mixture up to 90° C., (3) 2.0 ml of phthaloyl dichloride was added thereto. The mixture was then (4) heated up to 115° C. and reacted together for 2 hours under agitation. After completion of the reaction, (5) the solid matter was allowed to precipitate and the supernatant liquid was removed. The resultant solid matter was (6) washed twice with 200 ml of toluene under reflux. To the solid substance thus washed was added freshly 60 ml of toluene to form a suspension. To the suspension was added (7) 40 ml of TiCl$_4$, and the mixture was reacted together for 2 hours at 115° C. under agitation. In the resultant mixture, (8) a solid matter was allowed to precipitate and the supernatant liquid was removed. Next, the step (9) of washing the solid matter twice with 200 ml of toluene under reflux, suspending the solid matter in 60 ml of toluene to prepare a suspension, adding 40 ml of TiCl$_4$ to the suspension and reacting the mixture together at 115° C. for 2 hours under agitation, and then allowing the solid matter in the mixture to precipitate and removing the supernatant liquid, was repeated twice. After that, the resultant solid substance was washed ten times each with 200 ml of n-heptane maintained at 40° C. The titanium content of the solid catalyst component thus obtained was measured whereupon the content was determined as 2.00% by weight.

Polymerization

In a 2.0 liter autoclave provided with a stirring device, the air in which had been relaced sufficiently by nitrogen, were placed 200 mg of triethylaluminum, 45 mg of cyclohexylmethyldimethoxysilane and 3.0 mg of the catalyst component prepared above. The autoclave was then charged with 1.8 liters of gaseous hydrogen and 1.4 liters of liquefied propylene, and the mixture was maintained for 30 minutes at 70° C. to effect polymerization of propylene. After completion of the polymerization, the resultant polymer was dried at 80° C. under reduced pressure, and the amount in terms of gram of the polymer obtained was designated arbitrarily as (A). This polymer was extracted with boiling n-heptane for 6 hours to obtain a polymer insoluble in n-heptane, and the amount of this polymer was designated arbitrarily as (B).

The polymerization activity (C) per solid catalyst component used is calculated according to the following equation:

$$(C) = \frac{(A)(g)}{\text{Amount of the solid catalyst component (g)}}$$

The yield of the total crystalline polymer (D) is calculated according to the following equation:

$$(D) = \frac{(B)}{(A)} \times 100 \, (\%)$$

A result of the experiment obtained is shown in Table 1 wherein (E) stands for the amount of residual chlorine in the resulting polymer, (F) for the melt index (MI) of the resulting polymer and (G) for the bulk specific gravity of the resulting polymer.

EXAMPLE 2

An experiment was carried out in the same manner as described in Example 1 to prepare a solid catalyst component except that 2.5 ml of phthaloyl dichloride was used. Concerning polymerization of propylene, the reaction was carried out similarly as in Example 1. A result of the experiment obtained is shown in Table 1.

EXAMPLE 3

An experiment was carried out in the same manner as described in Example 1 except that xylene was used in the same amount in place of toluene. The titanium content of the resultant solid catalyst component was determined as 2.06% by weight. Concerning polymerization of propylene, the reaction was carried out similarly as in Example 1. A result of the experiment obtained is shown in Table 1.

EXAMPLE 4

The preparation of a solid catalyst component was carried out in the same manner as described in Example 1 except that the recurring operation (9) was repeated three times. Concerning polymerization of propylene, the reaction was carried out similarly as in Example 1. A result of the experi-obtained is shown in Table 1.

COMPARATIVE EXAMPLE 1

The preparation of a solid catalyst component was carried out in the same manner as described in Example 1 except that the recurring operation as described in (9) was not carried out. Concerning polymerization of propylene, the reaction was carried out similarly as in Example 1. A result obtained is shown in Table 1.

COMPARATIVE EXAMPLE 2

The preparation of a solid catalyst component was carried out in the same manner as described in Example 2 except that the recurring operation (9) as described in Example 1 was not carried out. Concerning polymerization of propylene, the reaction was carried out similarly as in Example 1. A result obtained is shown in Table 1.

COMPARATIVE EXAMPLE 3

The preparation of a solid catalyst component was carried out in the same manner as described in Example 3 except that the recurring operation (9) as described in Example 1 was not carried out. Concerning polymzeriation of propylene, the reaction was carried out similarly as in Example 1. A result obtained is shown in Table 1.

It is evident from Table 1 that the solid catalyst components of the present invention obtained in Examples 1–4 are extremely higher in polymerization activity and also in the yield of the polymer. In addition, it is noted that the yield of the stereoregular polymer insoluble in boiling n-heptane is very high in the polymers obtained in Examples 1–4 while the content of residual chlorine is extremely low in the polymers obtained in Examples 1–4, as compared with the polymers obtained in Comparative Examples 1–3.

It is understood that the preceding representative examples may be varied within the scope of the present specification both as to reactants and reaction conditions, by one skilled in the art to achieve essentially the same results.

As many widely different embodiments of this invention may be made without departing from the spirit and scope thereof, it is to be construed that this invention is not limited to the specific embodiment thereof except as defined in the appended claims.

TABLE 1

|  | Example | | | | Comparative Example | | |
| --- | --- | --- | --- | --- | --- | --- | --- |
|  | 1 | 2 | 3 | 4 | 1 | 2 | 3 |
| Amount of the total polymers (A) g | 204.6 | 200.4 | 203.1 | 210.3 | 96.6 | 93.3 | 97.2 |
| Amount of the polymer insoluble in boiling n-heptane (B) g | 201.7 | 198.2 | 200.3 | 206.7 | 95.2 | 92.4 | 95.9 |
| Polymerization activity per solid catalyst component (C) | 68200 | 66800 | 67700 | 70100 | 32200 | 31100 | 32400 |
| Yield of the total crystalline polymer (D) % | 98.6 | 98.9 | 98.6 | 98.3 | 98.6 | 99.0 | 98.7 |
| Amount of the residual chlorine in the resultant polymer (E) ppm | 9 | 9 | 9 | 9 | 19 | 19 | 19 |
| Melt index of the resultant polymer (F) | 2.9 | 4.0 | 2.7 | 4.3 | 3.8 | 2.7 | 4.7 |
| Bulk specific gravity of the resultant | 0.42 | 0.43 | 0.43 | 0.43 | 0.43 | 0.43 | 0.44 |

TABLE 1-continued

| | Example | | | | Comparative Example | | |
|---|---|---|---|---|---|---|---|
| | 1 | 2 | 3 | 4 | 1 | 2 | 3 |
| polymer (G) | | | | | | | |

What is claimed is:

1. A solid catalyst component for the polymerization of olefins, prepared by a series of the following steps:
   (1) suspending diethoxymagnesium (a) in the alkylbenzene (b),
   (2) bringing the resultant suspension into contact with titanium tetrachloride (c) in an amount of less than 1 in terms of volume ratio to the alkylbenzene (b) to form a mixture of (a), (b) and (c),
   (3) adding phthaloyl dichloride (d) to said mixture at a temperature ranging from 80° C. to 125° C. to form a whole mixture and subjecting the whole mixture to a reaction to form a reaction mixture,
   (4) maintaining the reaction mixture at a temperature within the above range for a period of 10 minutes to 10 hours under agitation,
   (5) eliminating liquid substance from the reaction mixture as far as possible to obtain a solid material,
   (6) washing the solid material with an alkylbenzene and suspending the solid material in the alkylbenzene (b),
   (7) bringing the resultant suspension into contact with the titanium tetrachloride (c) in an amount less than 1 in terms of volume ratio to the alkylbenzene (b) to form a reaction mixture,
   (8) eliminating liquid substance from the resultant reaction mixture as far as possible to obtain a solid substance, and
   (9) repeating the process consisting of the following steps (9-1), (9-2), (9-3) and (9-4) 2-4 times for the solid substance:
   (9-1) washing the solid substance with an alkylbenzene under reflux,
   (9-2) suspending the solid substance in the alkylbenzene (b),
   (9-3) bringing the resultant suspension into contact with the titanium tetrachloride (c) in an amount of less than 1 in terms of volume ratio to the alkylbenzene (b) to form a reaction mixture, and
   (9-4) eliminating liquid substance from the reaction mixture as far as possible to obtain a solid substance.

2. A solid catalyst component according to claim 1, wherein the titanium tetrachloride (c) is used in an amount of at least 1.0 g per 1.0 g of the diethoxymagnesium (a) but in an amount less than 1 in terms of volume ratio to the alkylbenzene (b).

3. A solid catalyst component according to any of claims 1-2, wherein the phthaloyl dichloride (d) is used in an amount of 0.01-0.5 ml per 1.0 g of the diethoxymagnesium (a).

4. A solid catalyst component according to any of claims 1-2, wherein the alkylbenzene is selected from tolune, xylene, ethylbenzene, propylbenzene and trimethylbenzene.

5. An olefin polymerization catalyst which comprises:
   (A) the solid catalyst component as claimed in claim 1,
   (B) a silicon compound of the general formula:

$$SiR_m(OR')_{4-m} \quad (I)$$

wherein R is a group selected from an alkyl group, a cycloalkyl group, an aryl group and vinyl group, R' is an alkyl group, and m is an integer satisfying the relation $0 \leq m \leq 3$, with the proviso that when m is 2 or 3, the plural R may be the same or different, and when R is an alkyl group, R may be same as R', and
   (C) an organoaluminum compound of the general formula:

$$R''_n AlX_{3-n} \quad (II)$$

wherein R" is an alkyl group, X is a halogen atom and n is an integer of 1-3, with the proviso that when n is 2 or 3, plural R" groups may be identical or different.

6. A solid catalyst component according to claim 3, wherein the alkylbenzene is selected from tolune, xylene, ethylbenzene, propylbenzene and trimethylbenzene.

* * * * *